(12) United States Patent
Ehrlich et al.

(10) Patent No.: US 11,595,281 B2
(45) Date of Patent: Feb. 28, 2023

(54) DATA LATENCY EVALUATION

(71) Applicant: AT&T Intellectual Property I, L.P., Atlanta, GA (US)

(72) Inventors: Willa Ehrlich, Highland Park, NJ (US); Elissa Backas, Sayreville, NJ (US); Farhan Mir, Montville, NJ (US); Jo Frabetti, Bronx, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/236,697

(22) Filed: Apr. 21, 2021

(65) Prior Publication Data
US 2022/0345387 A1 Oct. 27, 2022

(51) Int. Cl.
*H04L 43/0817* (2022.01)
*H04L 41/0816* (2022.01)
*H04L 43/065* (2022.01)
*H04L 43/0852* (2022.01)

(52) U.S. Cl.
CPC ...... *H04L 43/0817* (2013.01); *H04L 41/0816* (2013.01); *H04L 43/065* (2013.01); *H04L 43/0852* (2013.01)

(58) Field of Classification Search
CPC ............ H04L 43/0817; H04L 43/0852; H04L 43/065; H04L 41/0816
See application file for complete search history.

(56) References Cited

U.S. PATENT DOCUMENTS

| 8,073,946 | B1* | 12/2011 | Jaeger ..................... H04L 43/08 709/224 |
| 9,537,926 | B1* | 1/2017 | Sehn ...................... H04L 67/565 |
| 2007/0124353 | A1* | 5/2007 | Cockcroft ........... G06F 11/3428 708/200 |
| 2010/0094963 | A1* | 4/2010 | Zuckerman ......... H04L 67/1097 709/219 |
| 2018/0039672 | A1 | 2/2018 | Sharanabasawa et al. |
| 2021/0019321 | A1 | 1/2021 | Ehrlich et al. |
| 2021/0089424 | A1* | 3/2021 | Lackner ................ G06F 11/302 |

* cited by examiner

*Primary Examiner* — John A Follansbee
*Assistant Examiner* — Fadi Haj Said
(74) *Attorney, Agent, or Firm* — Amin, Turocy & Watson, LLP

(57) ABSTRACT

The described technology is generally directed towards methods for data latency evaluation. The techniques disclosed herein can provide useful information about when a data consumer can expect to receive data. Methods can create and compare data latency cumulative probability distributions comprising probabilities associated with different latency values, at various different levels of completeness.

20 Claims, 9 Drawing Sheets

DATA LATENCY EVALUATION

TECHNICAL FIELD

The subject application is related to fifth generation (5G) and subsequent generation cellular communication systems, e.g., to evaluating data latency under various circumstances in order to effectively understand and respond to the data latency.

BACKGROUND

In an increasingly electronic and connected world, there are numerous and diverse situations in which data consumers wait for production or delivery of data. For example, a streaming video service waits for video content to arrive before providing video content to subscribers. A traffic monitoring system waits for sufficient device global positioning system (GPS) data to arrive in order to measure a traffic backup condition. A medical device waits for sensor inputs to establish sufficient certainty that a medical condition exists, prior to alerting the patient or caregivers.

Many additional scenarios can be found in the systems employed in cellular communication networks. For example, cellular networks measure and report performance of their various network systems, and network devices wait for aggregation and analysis of performance information.

A better understanding of data latency, e.g., the likely expected delay in availability of data, with respect to data completeness level can inform decisions such as whether to wait for the data at all, when to perform processing tasks involving the data, and whether to upgrade devices and systems responsible for the latency. However, current technology lacks sufficiently powerful tools to evaluate data latency with respect to data completeness, and there is a need for more powerful tools for data latency evaluation.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
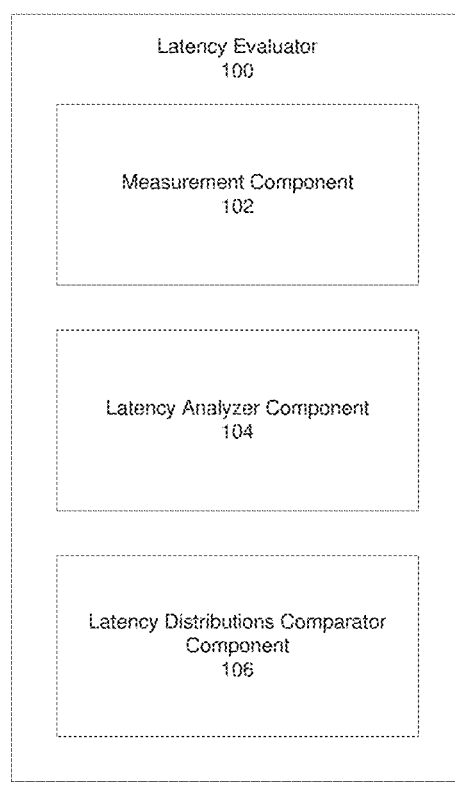
FIG. 1 illustrates example components of a latency evaluator, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards methods for data latency evaluation, and corresponding devices and computer readable media. In some examples, the techniques disclosed herein can provide useful information about when a data consumer can expect to receive data. At a more granular level of detail, methods herein can inform the data consumer when they can expect various different "levels of data completeness," such as five percent (5%), ten percent (10%), fifty percent (50%), one hundred percent (100%), or some other amount of data.

Exact information about when data will arrive is unknown, and therefore, methods disclosed herein can estimate probabilities. For example, through testing and measurement, methods can establish a ninety percent (90%) probability that a data consumer will receive fifty percent (50%) of their data in ten (10) minutes. Methods can furthermore establish, for example, a seventy (70%) probability that the data consumer will receive fifty percent (50%) of their data in five (5) minutes. For each level of data completeness, methods disclosed herein can derive probabilities associated with different amounts of delay, referred to herein as latency values. These probabilities can be represented visually in a cumulative probability distribution graph. The x axis of the graph can represent data latency values, and the y axis can represent a cumulative probability that a data latency measurement will be less than or equal to that latency value. These cumulative probability distributions may be referred to herein as "data latency cumulative probability distributions." A data latency cumulative probability distribution can be for a given level of data completeness. For conciseness, data latency cumulative probability distributions may be discussed while omitting discussion of the corresponding level of data completeness.

In order to generate a data latency cumulative probability distribution, some embodiments can conduct a test, also referred to herein as a performance benchmark. Embodiments can measure latencies during the performance benchmark to collect latency data, referred to herein as collected data latency values. Collected data latency values can then be used to generate data latency cumulative probability distributions for various levels of completeness.

Generated data latency cumulative probability distributions can be usefully employed in many different ways, and this disclosure is not limited to any particular useful application. In some embodiments, data latency cumulative probability distributions can be provided to the data consumer so that the data consumer has useful information to predict when they can expect data. In some embodiments, data latency cumulative probability distributions can be used in connection with service level agreements (SLAs) which can guarantee service defined by a data latency cumulative probability distribution. In still further embodiments, data latency cumulative probability distributions can be used to compare the effectiveness of two different data delivery architectures, allowing selection of an architecture that provides a better overall data latency cumulative probability distribution.

The techniques provided herein can also be employed in connection with myriad different types of data, delivered by a wide variety of upstream systems. To provide a few examples, the disclosed techniques can be used in connection with key performance indicator (KPI) data used for service assurance, video streaming data, traffic data, weather data, sensor data, evaluation data used to automate network architecture changes, cloud application data, and edge data provided by edge devices.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 5G, or other next generation networks, the disclosed aspects are not limited to a 5G implementation, and/or other network next generation implementations, as the techniques can also be applied, for example, in third generation (3G), or fourth generation (4G) systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates example components of a latency evaluator, in accordance with various aspects and embodiments of the subject disclosure. The example latency evaluator 100 can implement, e.g., a latency evaluator 202 illustrated in FIG. 2. The example latency evaluator 100 can include a measurement component 102, a latency analyzer component 104, and a latency distributions comparator component 106. A detailed description of the illustrated components is provided after discussion of FIG. 2.

Figure 2:
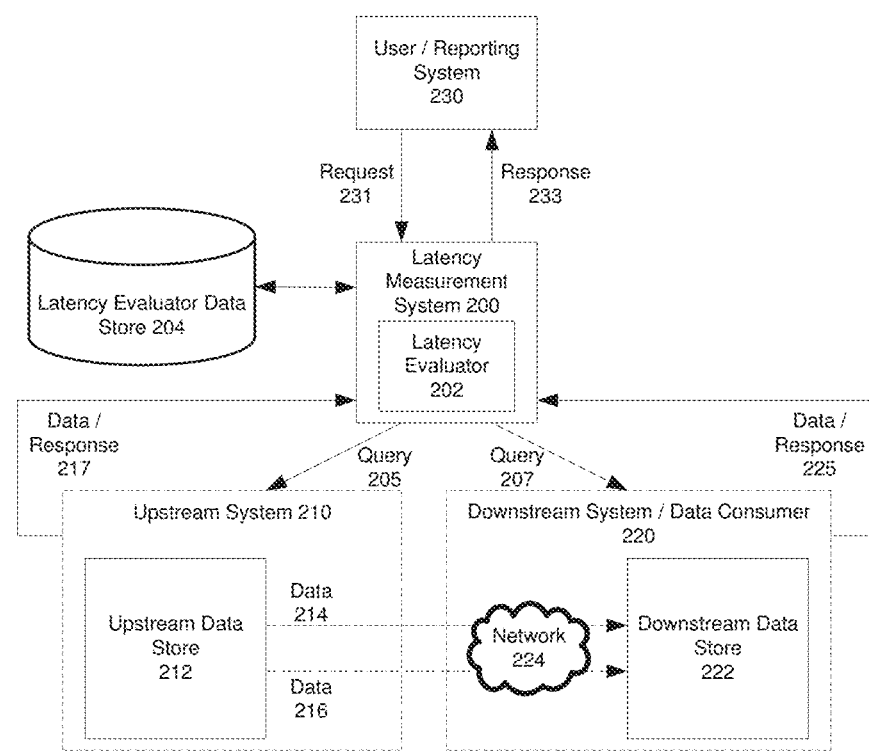
FIG. 2 illustrates an example system in which data latency can be evaluated, in accordance with various aspects and embodiments of the subject disclosure.

FIG. 2 illustrates an example system in which data latency can be evaluated, in accordance with various aspects and embodiments of the subject disclosure. FIG. 2 includes a latency measurement system 200 comprising a latency evaluator 202, a user/reporting system 230, a latency evaluator data store 204, an upstream system 210 comprising an upstream data store 212, and a downstream system/data consumer 220 comprising a network 224 and a downstream data store 222.

In FIG. 2, the upstream system 210 can deliver data 214 and data 216 to the downstream data store 222. Data 214 can comprise, e.g., a performance benchmark of data, which can be measured by latency evaluator 202. After latency of data 214 is measured, latency evaluator 202 can generate a data latency cumulative probability distribution according to the techniques disclosed herein, and the resulting data latency cumulative probability distribution can be used in connection with various example subsequent operations, as described herein. In one example, the data latency cumulative probability distribution can be used to estimate latency of subsequent data 216 delivered from upstream system 210 to the downstream data store 222.

In an embodiment, the downstream system/data consumer 220 can comprise a downstream data store 222 and a network 224. Alternatively, the network 224 can optionally be considered to be part of the upstream system 210. Any components involved in generating and delivering data 214 to downstream data store 222 can optionally be considered part of either upstream system 210 or downstream system/data consumer 220. Both the upstream system 210 and the network 224 can be responsible for latency of data 214 arriving at downstream system/data consumer 220, and so in some embodiments, latency measurements can include latencies associated with the upstream system 210, or both the upstream system 210 and the network 224.

In an example configuration according to FIG. 2, the latency evaluator 202 can be implemented at the latency measurement system 200. The latency evaluator 202 can be configured to receive a request 231 from user/reporting system 230, wherein the request 231 can initiate a latency measurement associated with the upstream system 210 and/or the downstream system/data consumer 220. The request 231 can furthermore specify parameters for a latency measurement, such as a level of data completeness. The latency evaluator 202 can perform a latency measurement, or multiple latency measurements, according to the request 231, and the latency evaluator 202 can return a response 233 comprising, e.g., a data latency cumulative probability distribution for a requested level of data completeness, or other requested latency information.

In order to measure latency of data 214 pursuant to request 231, the latency evaluator 202 can query 205 the upstream system 210, and the latency evaluator 202 can receive data/response 217 from the upstream system 217. The data/response 217 can comprise, e.g., origination times of the data 214 at the upstream data store 212. The latency evaluator 202 can store received data/response 217 in the latency evaluator data store 204.

In some embodiments, the latency evaluator 202 can also query 207 the downstream system/data consumer 220, and the latency evaluator 202 can receive data/response 225 from the downstream system/data consumer 220. The data/response 225 can comprise arrival times of the data 214 at the downstream data store 222. The latency evaluator 202 can store received data/response 217 in the latency evaluator data store 204.

In some embodiments, the latency evaluator 202 can be configured to determine and store, e.g., in the latency evaluator data store 204, differences between data origination times and data arrival times, as collected data latency values. The latency evaluator 202 can furthermore be configured to generate data latency cumulative probability distributions, compare data latency cumulative probability distributions, and perform the various other operations described herein.

In one example use of data latency cumulative probability distributions generated according to the techniques disclosed herein, a system comprising the latency evaluator 202, e.g., latency measurement system 200, can generate a first data latency cumulative probability distribution based on a first performance benchmark of data 214. After an equipment reconfiguration, e.g., of upstream system 210, the latency measurement system 200 can generate a second data latency cumulative probability distribution based on a second performance benchmark of data 214. The latency evaluator 202 can then compare the first data latency cumulative probability distribution with the second data latency cumulative probability distribution, in order to determine whether the reconfiguration of upstream system 210 had a significant effect on latency, according to any desired significance criterion.

Based on an outcome of the data latency cumulative probability distribution comparison, a determination can be made, e.g., by latency measurement system 200 or by user/reporting system 230, regarding whether to maintain the upstream system 210 in the original state (prior to reconfiguration) or to maintain the upstream system 210 in the reconfigured state (subsequent to the reconfiguration).

In another example use of data latency cumulative probability distributions generated according to the techniques disclosed herein, a system enabled to use the latency evaluator 202, e.g., the user/reporting system 230, can be configured use a received data latency cumulative probability distribution to determine, e.g., latency probabilities associated with receiving, by downstream system/data consumer 220, subsequent data 216 from the upstream system 210. Alternatively, the user/reporting system 230 can be configured to use a data latency cumulative probability distribution to determine whether delivery of subsequent data 216 is within an SLA between downstream system/data consumer 220 and upstream system 210.

In a still further arrangement, user/reporting system 230 can be configured to generate and send a report of latency probabilities associated with delivery of data 214. The user/reporting system 230 can be configured to use data latency cumulative probability distribution information to determine whether delivery of subsequent data 216 is within an SLA between a customer and a provider of the upstream system 210.

In an embodiment, user/reporting system 230 can comprise a service assurance monitoring application. Many service assurance monitoring applications as well as other reporting applications have an objective of near real-time KPI/message generation. For these monitoring applications, there exists a "window of time" following the start of an event to some future time when the generated KPI/message is no longer "news-worthy" to the customer. These applications need to know, from upstream system(s) 210, when to expect receipt of some data for a KPI calculation/message creation and the probabilities, as well as when to expect the arrival of all data required for KPI calculation/message creation (and the probabilities). Thus, such reporting systems face a conundrum between data completeness and timeliness.

When delay of upstream system 210 is unacceptable, then user/reporting system 230 can request and then evaluate data completion and latency following an end-to-end end architecture change of upstream system 210, e.g., pursuant to reconfiguration instructions provided to the upstream system 210. However, delay values are not known with certainty, they exhibit statistical variation. Therefore, a user/reporting system 230 can be configured to appropriately evaluate a second performance benchmark of data 214 executed following upstream system 210 performance improvement, e.g., pursuant to reconfiguration instructions, against a first performance benchmark of data 214 executed prior to the upstream performance improvement.

In view of the above, embodiments can apply a generic definition of the upstream system 210. An upstream system 210 can refer, for example, to a database management system (DBMS); a physical or virtual server; or a subscription service. The upstream system 210 can reside in a public or private cloud. The upstream system 210 can itself be the client of another upstream system. Hence, delay caused by upstream system 210 may be attributed to further upstream systems' delays. Embodiments of this disclosure can be concerned with total end-to-end delay of data 214 from the viewpoint of the downstream system/data consumer 220.

Returning now to FIG. 1, a more detailed discussion of the illustrated components of the example latency evaluator 100 can be understood. The measurement component 102 can be configured to measure latency and data completeness metrics on data 214 from upstream system 210. The measurement component 202 can also be applied to data that arrive asynchronously "in motion" within a stream arriving at downstream system/data consumer 220. In this context, a messaging service can be the upstream system 210. An example messaging service is a data movement as a platform (DMaaP) message router, which is a reliable, high-volume publication/subscription messaging service.

In some embodiments, latency evaluator 100, and optionally, the measurement component 102 can furthermore include a mechanism for specifying at what level of data completeness to analyze data latency. For example, does the user/reporting system 230 want to know about data latency as soon as 5% of data required for KPI become available from the upstream system 210, so that the user/reporting system 230 can start reporting KPI based on some data, or does the user/reporting system 230 want to know about data latency when all the data are available for a KPI calculation.

The latency analyzer component 104 can be configured to generate distributions of latency values given a specified degree of upstream data completeness. The resulting data latency cumulative probability distributions enable a user/reporting system 230 to derive the probability of observing an upstream delay value less than or equal to some value when, for example, 5% of the data required for KPI calculation are available from the upstream system 210. Each data latency cumulative probability distribution can be considered part of a performance benchmark. Each performance benchmark can be executed within a given upstream system 210 architecture configuration.

The latency analyzer component 104 can be configured to statistically summarize the probability of data latency being less than or equal to a given value, for a specified level of data completeness. In the example context of a reporting system, data latency can be defined as a time at which the reporting system 230 queried 205 these data in the upstream system 210 (and the data were there) minus time at which these data were initially generated by upstream data store 212. For example, suppose a reporting system 230 wants to know the probability distribution of data latency as soon as some data (e.g., 5%) are available from the upstream system 210. The latency analyzer component 104 can generate a cumulative probability distribution function (CDF) representing the probability of observing a delay value less than or equal to some specified value when 5% of the data required for KPI calculation were available in the upstream system 210.

The latency distributions comparator component 106 can be configured to compare data latency cumulative probability distributions, e.g., in order to evaluate a design change for upstream system 210. The latency distributions comparator component 106 can statistically compare a pair of data latency cumulative probability distributions with respect to latency magnitude. In an example embodiment, the latency distributions comparator component 106 can declare a data latency cumulative probability distribution to be stochastically greater than another data latency cumulative probability distribution when the probability of latency being below a certain value is always greater in one distribution than in the other.

Assume one data latency cumulative probability distribution, referred to as performance benchmark distribution A, corresponds to a baseline performance benchmark made prior to an architecture change within the upstream system 210. Assume a second data latency cumulative probability distribution, referred to as performance benchmark distribution B, corresponds to a performance benchmark following the architecture change. The latency distributions comparator component 106 can be configured to determine whether performance benchmark distribution B latency has a statistically greater probability of being lower than the corresponding performance benchmark distribution A latency for all latency values.

In an example service assurance system (SAS) embodiment, an SAS at user/reporting system 230 can analyze performance statistics on call detail records (CDRs) and generate KPIs for its end users. CDRs are generated from voice over LTE (VoLTE) devices and are then streamed via DMaaP messages to virtual machines in a public cloud. These CDRs are subsequently aggregated and loaded into an elastic search data store for subsequent performance queries by client systems such as the SAS. In this context, the elastic search data store is the immediate upstream system 210 to the SAS.

An example performance aggregation performed by a DBMS can comprise a number of CDRs that terminate with a given disposition (e.g., fail) for a given VoLTE IP multimedia subsystem (IMS) edge device, e.g., a proxy call session control function (PCSCF), given a CDR creation timestamp or service request timestamp.

In such a circumstance, the SAS can query the elastic search data store to retrieve CDR fail statistics for each of a set of PCSCFs, e.g., at consecutive five minute time intervals. Based on these performance statistics, the SAS can then report to its clients a KPI metric representing the extent to which the total volume of PCSCF failures occurring within this five minute Δt is dominated by a very small number of "heavy-hitter" alarming/alerting PCSCF devices.

Assume SAS users have specified the following example requirements: First, they must receive this KPI with a latency of ≤15 minutes with probability=0.75 given KPI derived from all CDRs (KPI derived from 100% complete data). Second, they must receive this KPI with a latency of ≤25 minutes with probability=0.95 given KPI derived from all CDRs (KPI derived from 100% complete data). Finally, they must receive this KPI with a latency of ≤7 minutes with probability=0.75 given KPI derived from an initial subset of CDRs (KPI derived from 5% complete data). Embodiments of this disclosure allow the SAS to demonstrate that it can meet such requirements.

The measurement component 102 can be configured to consider the data count, number of failed VoLTE CDRs for a network element (NE), at time t. A service request timestamp can represent a timestamp assigned to the NE's measurement by the originating downstream system.

The measurement component 102 can be configured to repeatedly query the data store for records on the NE for a specified aggregation interval (in this example, five minutes) for a specified aggregation time interval. The aggregation interval, the query rate (in this example, once every five minutes) and the query duration (in this example, twenty four hours) can be configurable.

At some point, the measurement component 102 detects that its repeated querying on the network element for the specified time aggregation is returning a same set of values. The measurement component 102 can then compute a total failure count for the NE for the specified aggregation time interval, arriving at some result, e.g., thirty six. The measurement component 102 can now also derive a series of records on the network element for this specific aggregation interval. Each record can specify a number of failures observed, a proportion of total failures observed, and a latency measured for the network element when data collection for this specific 5-minute aggregation interval was being monitored.

The number of records generated for a given NE over a specified aggregation interval can increase as the query rate increases. The query rate can be adjusted to increase or decrease the observed number of levels of completeness. Two example levels of completeness are: delay associated when first obtaining any data (minimum data for a KPI data computation) and the delay required to obtain all of the data for a KPI computation (maximum delay after which subsequent counts remain stable).

The latency analyzer component 104 can be configured to perform a distribution analysis on results collected by the measurement component 102, for a given performance benchmark. A resulting data latency cumulative probability distribution can comprise, e.g., a table such as the below example table:

| Proportion of Measurements with Delay ≤ x Minutes | Latency Value in Minutes to Retrieve Upstream Data | |
| --- | --- | --- |
| | Retrieve Some Upstream Data | Retrieve All Upstream Data |
| 0.05 | 10 | 20 |
| 0.1 | 10 | 25 |
| 0.15 | 10 | 30 |
| 0.2 | 10 | 35 |
| 0.25 | 10 | 35 |
| 0.3 | 10 | 40 |
| 0.35 | 15 | 40 |
| 0.4 | 15 | 40 |
| 0.45 | 15 | 40 |
| 0.5 | 15 | 40 |
| 0.55 | 15 | 45 |
| 0.6 | 15 | 45 |
| 0.65 | 15 | 50 |
| 0.7 | 15 | 55 |
| 0.75 | 20 | 60 |
| 0.8 | 20 | 90 |
| 0.85 | 20 | 120 |
| 0.9 | 25 | 140 |
| 0.95 | 30 | 155 |
| 1 | 145 | 700 |

The table above includes two data latency cumulative probability distributions, each associated with a different level of completeness. Column two presents a data latency cumulative probability distribution comprising latency values measured when retrieving CDR failure counts for NEs for five minute Δt intervals as soon as some upstream data were available. Column three presents a data latency cumulative probability distribution comprising latency values measured when all upstream data for the five minute aggregation for a given NE were available. Each cell in the table presents the latency value, $x_0$, corresponding to a specified proportion of latency measurements $\leq x_0$.

Based on a data latency cumulative probability distribution such as the above, a downstream application may for example decide to: wait 25 minutes (from time of start of a given NE aggregation interval) before querying the upstream data store to generate a preliminary KPI for that time interval based on partial data (with a probability of 0.9 of retrieving partial data for the KPI), and wait 60 minutes (from time of start of a given aggregation interval) before querying the upstream data store to generate an updated KPI for that time interval based on complete data (with a probability of 0.75 of retrieving all data for the KPI).

Figure 3:
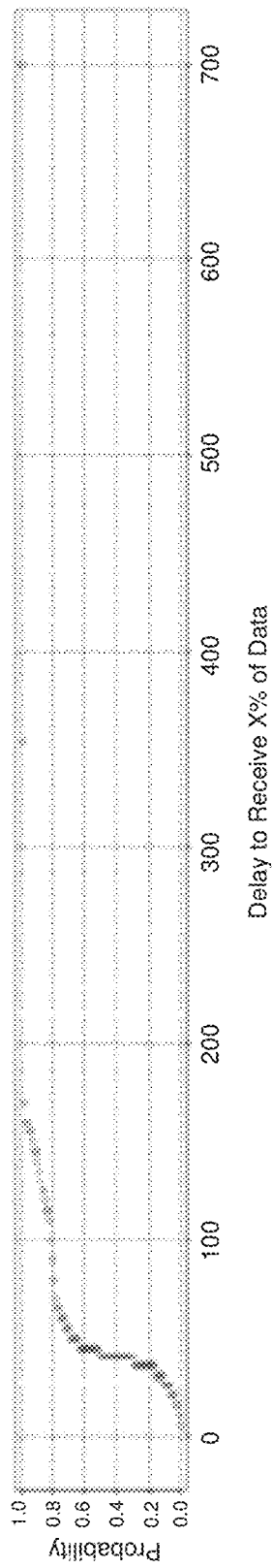
FIG. 3 illustrates an example data latency cumulative probability distribution, in accordance with various aspects and embodiments of the subject disclosure.

FIG. 3 illustrates an example data latency cumulative probability distribution, in accordance with various aspects and embodiments of the subject disclosure. The example data latency cumulative probability distribution 300 can be associated with an equipment configuration #1, e.g., a first performance benchmark conducted with a first configuration of an upstream system 210. The data latency cumulative probability distribution 300 is formatted as a graph with distribution latency values for a given level of completeness (delay to receive X % of data) on the x axis, and probability on the y axis. The level of completeness (X %) can comprise any portion and up to all data, e.g. 5%, 25%, 50%, or 100% of data. Two particular levels of completeness may be of interest in some embodiments: a level of completeness corresponding to a minimum amount of the data to complete a minimum computation using the data; and a level of data completeness comprises an amount of data sufficient to complete a full computation using the data.

Figure 4:
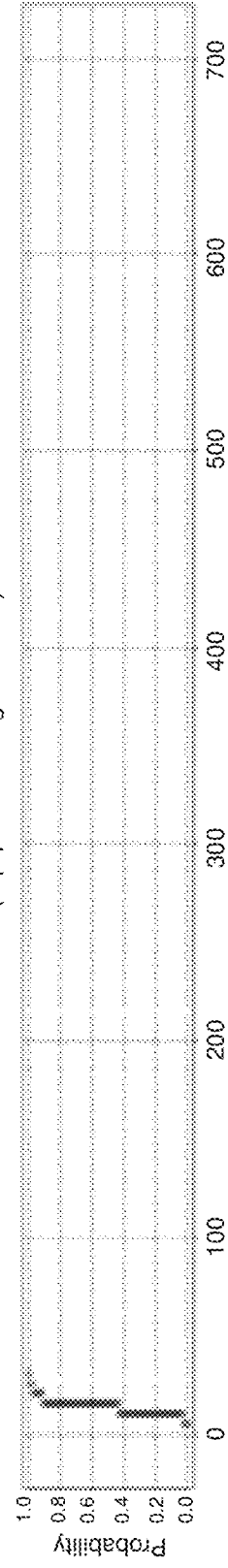
FIG. 4 illustrates another example data latency cumulative probability distribution, in accordance with various aspects and embodiments of the subject disclosure.

FIG. 4 illustrates another example data latency cumulative probability distribution, in accordance with various aspects and embodiments of the subject disclosure. The example data latency cumulative probability distribution 400 can be associated with an equipment configuration #2, e.g., a second performance benchmark conducted with a second configuration of an upstream system 210. As in FIG. 3, the data latency cumulative probability distribution 400 in FIG. 4 is formatted as a graph with distribution latency values for a given level of completeness (delay to receive X % of data) on the x axis, and probability on the y axis.

FIG. 3 and FIG. 4 represent data latency cumulative probability distributions that can be output by a latency evaluator 202. For example, either or both of data latency cumulative probability distribution 300 and data latency cumulative probability distribution 400 can be provided to a user/reporting system 230, e.g., as response 233, to allow user/reporting system 230 to understand the expected latency associated with upstream system 210. In some embodiments, data latency cumulative probability distribution 300 and data latency cumulative probability distribution 400 can be associated with different configurations of the upstream system 210, and a latency distributions comparator component 106 can compare the data latency cumulative probability distributions 300 and 400 to determine whether to adopt an equipment configuration change. First and second performance benchmarks can be executed to evaluate the impact of an architecture upgrade initiated by an upstream system 210, e.g., an architecture upgrade initiated by an upstream DBMS system.

FIG. 3 can include, e.g., the results of a performance benchmark made prior to an upstream DBMS increasing its CDR load rate. FIG. 4 can include, e.g., the results of performance benchmark made following implementation of a higher CDR load rate for the DBMS upstream system 210.

The latency values in FIG. 3 and FIG. 4 can represent time in minutes for the user/reporting system 230 to obtain, e.g. all data (100% completeness) for a given aggregation interval for a given NE.

The plotted functions represent cumulative probability distribution functions (CDFs) and represent the fitted probabilities of observing an upstream data delay value less than or equal to some value. If we select any upstream delay value on the x axis, in this example it is clear that there is a higher probability of observing either that data delay value or a lower value following the DBMS intervention (FIG. 4) than before the DBMS intervention (FIG. 3).

A statistical comparison of the illustrated CDFs indicates that the data latency cumulative probability distributions are statistically different, with the FIG. 4 CDF being stochastically greater than the FIG. 3 CDF. In other words, for any delay value, the probability of observing that delay value or lower was greater (higher) in FIG. 4 than in FIG. 3. Consequently, in an embodiment, the latency distributions comparator component 106 can declare that the FIG. 4 CDF is stochastically greater than the FIG. 3 CDF.

Figure 5:
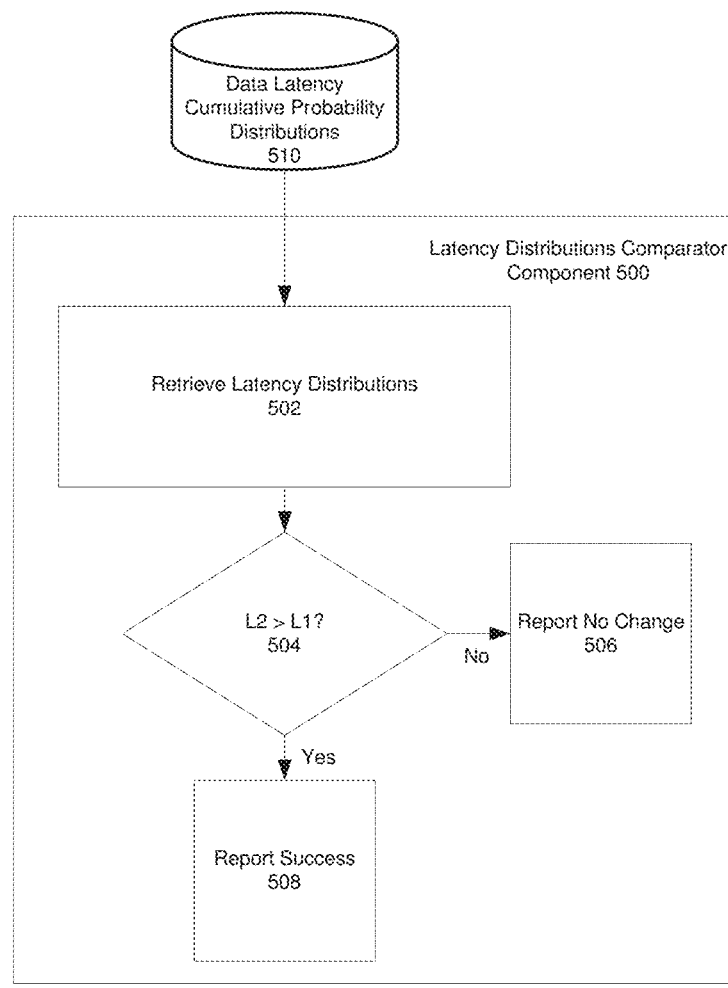
FIG. 5 illustrates an example module configured to compare data latency cumulative probability distributions, in accordance with various aspects and embodiments of the subject disclosure.

FIG. 5 illustrates an example module configured to compare data latency cumulative probability distributions, in accordance with various aspects and embodiments of the subject disclosure. FIG. 5 includes a latency distributions comparator component 500, which can implement the latency distributions comparator component 106 in some embodiments. The latency distributions comparator component 500 includes retrieve latency distributions 502, L2>L1? 504, report no change 505, and report success 508.

In an example operation of the latency distributions comparator component 500, data latency cumulative probability distributions 510 can comprise a component of latency evaluator data store 204. Data latency cumulative probability distributions 510 can comprise data latency cumulative probability distributions generated by a latency evaluator 202. Retrieve latency distributions 502 can be configured to retrieve two data latency cumulative probability distributions, including a first data latency cumulative probability distribution (L1) and a second data latency cumulative probability distribution (L2), from data latency cumulative probability distributions 510. L2>L1? 504 can then determine whether L2 is greater L1. If yes, report success 508 can report that the comparison was a success. If no, report no change 505 can report that the comparison did not result in a sufficiently significant change.

In another example, retrieve latency distributions 502 can retrieve data latency cumulative probability distributions $L_i^j$ and $L_{i'}^j$ from a persistent data store that implements data latency cumulative probability distributions 510. L2>L1? 504 can determine if an $L_i^j$ CDF is greater than an $L_{i'}^j$ CDF. If yes, report success 508 can be initiated. If no, then report no change 505 can be initiated.

In an embodiment, an arrangement such as illustrated in FIG. 5 can be used by a user/reporting system 230 to determine the impact of a change in an end-to-end solution architecture on SLAs. The user/reporting system 230 can retrieve data latency cumulative probability distributions from a data latency cumulative probability distributions data store 510 given a specified j. These data latency cumulative probability distributions can be referred as $L_i^j$ and data latency cumulative probability distribution $L_{i'}^j$, $i \neq i'$, where i' indexes a data latency cumulative probability distribution derived from a performance benchmark after an architecture change and i indexes a data latency cumulative probability distribution derived from a performance benchmark prior to the architecture change.

Any desired statistic can optionally be applied to determine whether two probability distribution functions differ and therefore whether $L_i^j$ is stochastically greater than $L_i^j$. One example statistic can measure a largest vertical distance (difference in the cumulative probabilities), D, between the CDFs associated with $L_i^j$ and $L_i^j$. If D is greater than the critical value, then the probability of a latency value being less than or equal to some value is higher than $L_i^j$ versus $L_i^j$.

The above statistic is just one distribution-free test of goodness-of-fit for testing hypotheses on two cumulative distribution functions, $F_x(x)$ and $F_0(x)$, based on measures of distance. In the current context, the null hypothesis, $H_0$: $F_x = F_0$, states that that the data latency cumulative probability distributions for a given data completeness setting are the same for both architecture configurations, while the alternative hypothesis, $H_1$: $F_x \geq F_0$, states that $F_x$, the data latency cumulative probability distribution derived from a performance benchmark conducted after "a performance" intervention, is stochastically greater (i.e., has smaller latency values) than $F_0$, the data latency cumulative probability distribution derived from a performance benchmark executed before the "performance intervention." Other distribution-free statistics include the Kolmogorov-Smirnov statistic, the Cramer-von Mises statistic that measures a type of mean squared deviation between $F_x(x)$ and $F_0(x)$, and the Pearson's product probability test that has a chi-squared distribution with 2n degrees of freedom under the null hypothesis. These statistics (as well as others) can also be applied to test $H_0$ and $H_1$ hypotheses.

If D were statistically significant, then, as shown in FIG. 5, embodiments can report success 508 that the intervention was successful in reducing upstream system delay. If D were not significant, then embodiments can report no change 505, indicating that the intervention had no effect.

Figure 6:
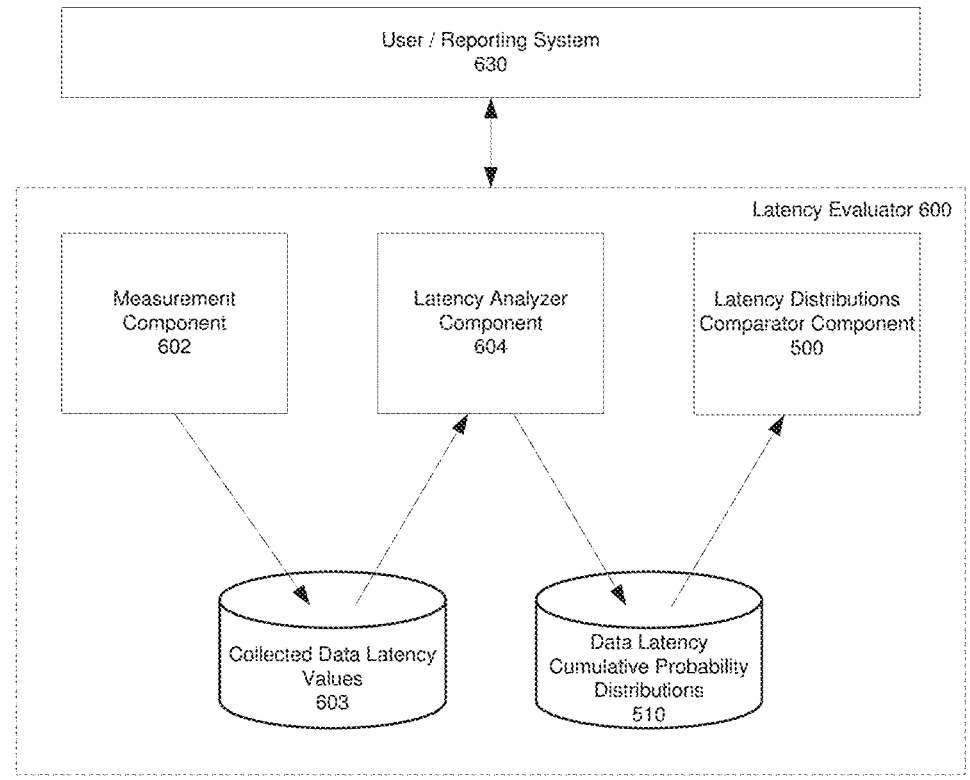
FIG. 6 illustrates another set of example components of a latency evaluator, in accordance with various aspects and embodiments of the subject disclosure.

FIG. 6 illustrates another set of example components of a latency evaluator, in accordance with various aspects and embodiments of the subject disclosure. The example latency evaluator 600 can implement, e.g., the latency evaluator 100 or the latency evaluator 202 in some embodiments. The example latency evaluator 600 includes a measurement component 602, collected data latency values 603, latency analyzer component 604, data latency cumulative probability distributions 510, and latency distributions comparator component 500. The latency evaluator 600 can interact with a user/reporting system 630, wherein the user/reporting system 630 can implement user/reporting system 230.

In FIG. 6, the measurement component 602, latency analyzer component 604, and latency distributions comparator component 606 are analogous to the measurement component 102, latency analyzer component 104, and latency distributions comparator component 106 introduced in FIG. 1, and the collected data latency values 603 and data latency cumulative probability distributions 510 can comprise components of a latency evaluator data store 204.

FIG. 6 illustrates an example arrangement of components, wherein the measurement component 602 stores latency values in the collected data latency values 603, and the latency analyzer component 604 uses collected data latency values 603 to generate data latency cumulative probability distributions for storage in data latency cumulative probability distributions 510. Furthermore, latency distributions comparator component 500 can use data latency cumulative probability distributions stored in data latency cumulative probability distributions 510 in connection with its operations illustrated in FIG. 5.

In an embodiment, the measurement component 602 can be configured to generate upstream system latency measurements for a performance benchmark i. The measurement component 602 can store the upstream system latency measurements in collected data latency values 603. The latency analyzer component 604 can be configured to use the collected latency values 603 to create data latency cumulative probability distributions $i^j$ for data completeness levels j. The latency analyzer component 504 can store the data latency cumulative probability distributions $i^j$ for data completeness levels j in the data latency cumulative probability distributions 510. The latency distributions comparator component 500 can be configured to compare data latency cumulative probability distributions for a given data completeness level of the data completeness levels j.

The user/reporting system 630 can be configured to send requests to latency evaluator 600, and to receive reports therefrom, as described in connection with FIG. 2. In this regard, the user/reporting system 630 can be configured to configure and provide performance benchmark requests, performance benchmark comparison requests, and SLA analysis requests. The user/reporting system 630 can furthermore be configured to receive performance benchmark results, performance benchmark comparison results, and SLA analysis results.

An SLA component at user/reporting system 630, or alternatively, within latency evaluator 600, can be configured to establish or confirm compliance with service level agreements based on data latency cumulative probability distributions of the data latency cumulative probability distributions 510. The user/reporting system 630 can establish a SLA with respect to an ith end-to-architecture configuration and for a jth level of data completeness, using performance benchmark$_i$. This solution enables a user/reporting system 630 to iterate multiple times in order to establish a SLA satisfactory to downstream client systems. Furthermore, by specifying a SLA conditional on j (i.e., specifying a SLA for a given data completeness percentage), a user/reporting system 630 can simultaneously maintain different SLAs for different customers.

Figure 7:
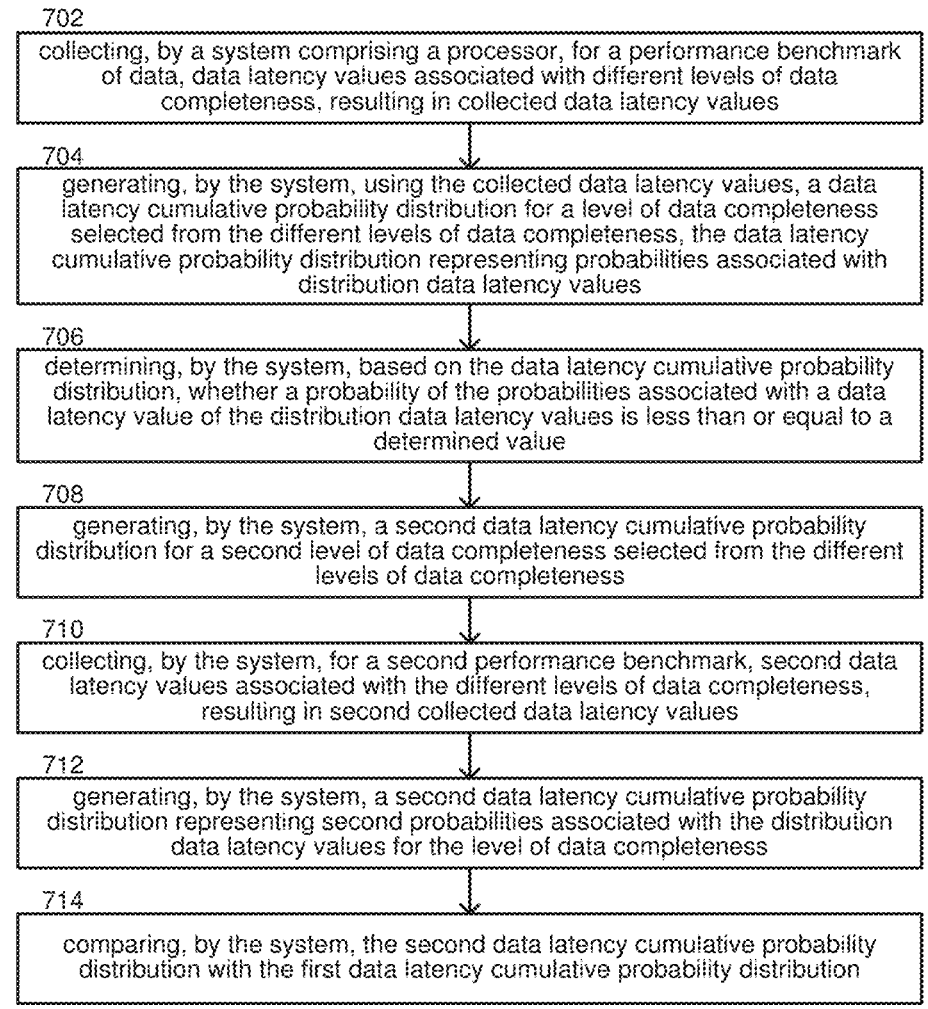
FIG. 7 is a flow diagram representing example operations of a system, the operations including collecting data latency values and generating a data latency cumulative probability distribution, in accordance with various aspects and embodiments of the subject disclosure.

FIG. 7 is a flow diagram representing example operations of a system, the operations including collecting data latency values and generating a data latency cumulative probability distribution, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by a system comprising a latency evaluator 202, such as the latency measurement system 200. Example operation 702 comprises collecting, by a system comprising a processor, e.g., by the latency evaluator 202, for a performance benchmark of data 214, data latency values associated with different levels of data completeness, resulting in collected data latency values. Example levels of data completeness include, e.g., a minimum amount of the data to complete a minimum computation using the data, and an amount of data sufficient to complete a full computation using the data.

Example operation 704 comprises generating, by the system 200, using the collected data latency values, a data latency cumulative probability distribution, such as the data latency cumulative probability distribution 300 illustrated in FIG. 3, for a level of data completeness selected from the different levels of data completeness, the data latency cumulative probability distribution representing probabilities associated with distribution data latency values. As shown in FIG. 3, the data latency cumulative probability distribution 300 represents probabilities, namely y axis values, associated with distribution data latency values, on the x axis.

Example operation 706 comprises determining, by the system 200, based on the data latency cumulative probability distribution 300, whether a probability of the probabilities associated with a data latency value of the distribution data latency values is less than or equal to a determined value. For example, for any of the distribution data latency value on the x axis of the data latency cumulative probability distribution 300, a corresponding probability value can be determined by reference to the plotted curve, and it can be determined whether such probability is less than or equal to a determined value.

Example operation 708 comprises generating, by the system, a second data latency cumulative probability distribution, for a second level of data completeness selected from the different levels of data completeness. The data latency cumulative probability distribution 300 illustrated in FIG. 3 is illustrated as for a 100% level of data completeness, however, other levels of completeness, such as 5%, 25%, 50%, or otherwise are also supported.

Example operation 710 comprises collecting, by the system 200, for a second performance benchmark, e.g., a second delivery of data 214 after a configuration change to upstream system 210, second data latency values associated with the different levels of data completeness, resulting in second collected data latency values. Example operation 712 comprises generating, by the system 200, a second data latency cumulative probability distribution, e.g., a data latency cumulative probability distribution 400 such as illustrated in FIG. 4, representing second probabilities associated with the distribution data latency values (along the x axis) for the level of data completeness. Example operation 714 comprises comparing, by the system 200, the second data latency cumulative probability distribution 400 with the first data latency cumulative probability distribution 300.

Comparing the second data latency cumulative probability distribution 400 with the first data latency cumulative probability distribution 300 can be performed according to various different techniques. In some embodiments, comparing the second data latency cumulative probability distribution 400 with the first data latency cumulative probability distribution 300 can comprise comparing probabilities associated with any one or more distribution data latency values (along the x axis) on the data latency cumulative probability distributions 300, 400. For example, a second probability of the second probabilities on the data latency cumulative probability distribution 400 can be compared with a first probability of the first probabilities on the data latency cumulative probability distribution 300, wherein the first probability and the second probability are associated with a selected distribution data latency value (e.g., any distribution latency value on the x axis) of the distribution data latency values.

In another example, comparing the second data latency cumulative probability distribution 400 with the first data latency cumulative probability distribution 300 can comprise determining whether second ones of the second probabilities of the second data latency cumulative probability distribution 400 comprise greater probabilities of respective latencies being below selected distribution latency values than corresponding first ones of the first probabilities associated with the first data latency cumulative probability distribution 300.

In still further example, comparing the second data latency cumulative probability distribution 400 with the first data latency cumulative probability distribution 300 can comprise determining, e.g., whether the second data latency cumulative probability distribution 400 has a greater probability associated with all distribution latency values. If this is the case, then the second data latency cumulative probability distribution 400 will always have a higher probability of delivering data 214 faster than the first data latency cumulative probability distribution 300.

Figure 8:
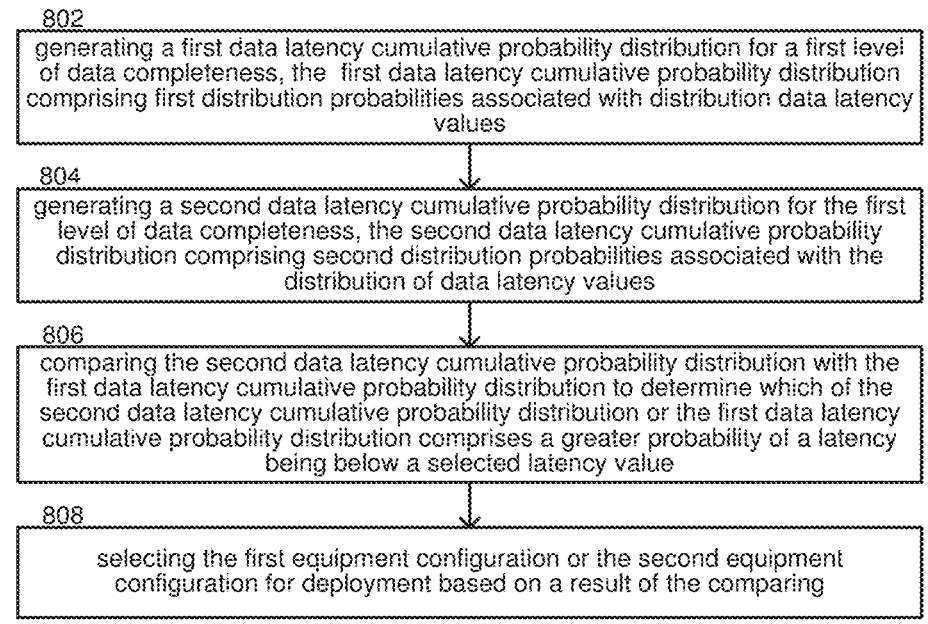
FIG. 8 is a flow diagram representing example operations of a system, the operations including generating and comparing data latency cumulative probability distributions, in accordance with various aspects and embodiments of the subject disclosure.

FIG. 8 is a flow diagram representing example operations of a system, the operations including generating and comparing data latency cumulative probability distributions, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a system comprising a latency evaluator 202, such as the latency measurement system 200. Example operation 802 comprises generating a first data latency cumulative probability distribution 300 for a first level of data completeness, e.g. 50% completeness or some other completeness level, the first data latency cumulative probability distribution 300 comprising first distribution probabilities (y axis values in FIG. 3) associated with distribution data latency values (x axis values in FIG. 3). Generating the first data latency cumulative probability distribution 300 can comprise conducting a first performance benchmark of data 214 using a first equipment configuration, e.g., a first configuration of upstream system 210.

In some embodiments, generating the first data latency cumulative probability distribution 300 can comprise collecting, for a first performance benchmark of data 214, first data latency values associated with multiple levels of data completeness including the first level of data completeness. Other data latency cumulative probability distributions, other than data latency cumulative probability distribution 300, can optionally be generated to correspond to other levels of data completeness.

Example operation 804 comprises generating a second data latency cumulative probability distribution 400 for the first level of data completeness, e.g. 50% completeness, the second data latency cumulative probability distribution 400 comprising second distribution probabilities (y axis values in FIG. 4) associated with the distribution of data latency values (x axis values in FIG. 4). Generating the second data latency cumulative probability distribution 400 can comprise conducting a second performance benchmark of data 214 using a second equipment configuration, e.g., a second configuration of upstream system 210.

In some embodiments, generating the second data latency cumulative probability distribution 400 can comprise collecting, for a second performance benchmark of data 214, second data latency values associated with the multiple levels of data completeness (i.e., the levels of data completeness used in connection with operation 802) including the first level of data completeness. Other data latency cumulative probability distributions, other than data latency cumulative probability distribution 400, can optionally be generated to correspond to other levels of data completeness.

Example operation 806 comprises comparing the second data latency cumulative probability distribution 400 with the first data latency cumulative probability distribution 300 to determine which of the second data latency cumulative probability distribution 400 or the first data latency cumulative probability distribution 300 comprises a greater probability of a latency being below a selected latency value. For example, second data latency cumulative probability distribution 400 comprises a greater probability than the first data latency cumulative probability distribution 300 of a latency being below a selected latency value of 50 minutes (in this example, second data latency cumulative probability distribution 400 comprises a greater probability than the first data latency cumulative probability distribution 300 of a latency being below any selected latency value, as can be observed with reference to FIG. 3 and FIG. 4).

Comparing data latency cumulative probability distributions 300, 400 at operation 806 can comprise comparing the second distribution 400 probabilities with the first distribution 300 probabilities at one selected latency value, at multiple selected latency values, or at all of the data latency values. Furthermore, other data latency cumulative probability distributions corresponding to other levels of data completeness can also be compared in some embodiments.

Example operation 808 comprises selecting the first equipment configuration or the second equipment configuration for deployment based on a result of the comparing. For example, the first configuration of upstream system 210 or the second configuration of upstream system 210 can be selected, using techniques such as described in connection with FIG. 5.

Figure 9:
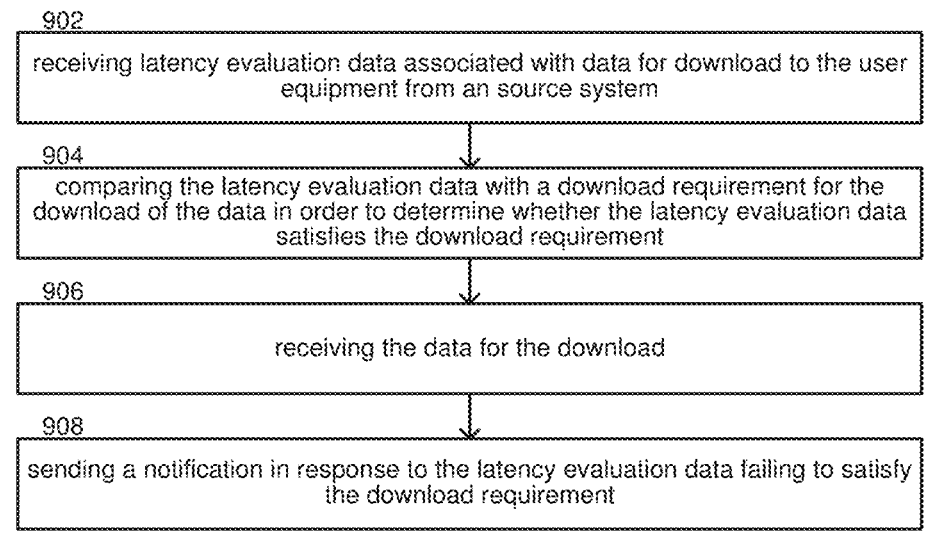
FIG. 9 is a flow diagram representing a set of example operations of a data consumer, in accordance with various aspects and embodiments of the subject disclosure.

FIG. 9 is a flow diagram representing a set of example operations of a data consumer, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a data consumer 220 illustrated in FIG. 2. The data consumer 106 can optionally be configured as user equipment described with reference to FIG. 11. Example operation 902 comprises receiving latency evaluation data associated with data 216 for download to the user equipment (data consumer 220) from a source system 210. The received latency evaluation data can comprise, or can be derived from, a data latency cumulative probability distribution which is generated for example at latency measurement system 200 comprising the latency evaluator 202. Example latency evaluation data can comprise: a level of completeness that indicates an amount of the data 216 for download; a latency value corresponding the level of completeness; and a probability value that indicates a likelihood of the download of the data 216 to the user equipment 220 being performed at or above the level of completeness and with a latency at or below the latency value.

In some embodiments, latency evaluation data can include a full data latency cumulative probability distribution such as data latency cumulative probability distribution 300, and/or multiple data latency cumulative probability distributions corresponding to different levels of completeness. For example, latency evaluation data can include multiple respective levels of completeness, that indicate different respective amounts of the data 216 for the download, multiple respective latency values corresponding to respective levels of completeness of the multiple respective levels of completeness, and multiple respective probability values that indicate different respective likelihoods of the download of the data 216 to the user equipment 220 being performed at or above respective levels of completeness of the multiple respective levels of completeness and with latency values at or below respective latency values of the multiple respective latency values.

Example operation 904 comprises comparing the latency evaluation data with a download requirement for the download of the data 216 in order to determine whether the latency evaluation data satisfies the download requirement. Comparing the latency evaluation data with the download requirement can comprise comparing multiple respective probability values with multiple respective download requirements.

Example operation 906 comprises receiving the data 216 for the download. In some embodiments, receiving the latency evaluation data and comparing the latency evaluation data with the download requirement can be performed during the receiving of the data 216 for the download. In other words, the operations described herein can be performed in real-time or near real-time and substantially simultaneously with receiving data 216 from an upstream system 210.

Example operation 908 comprises sending a notification in response to the latency evaluation data failing to satisfy the download requirement. For example, the user equipment 220 can notify the latency measurement system 200 or the upstream system 210 of failure of the upstream system 210 to meet a data consumer 220 requirement.

Figure 10:
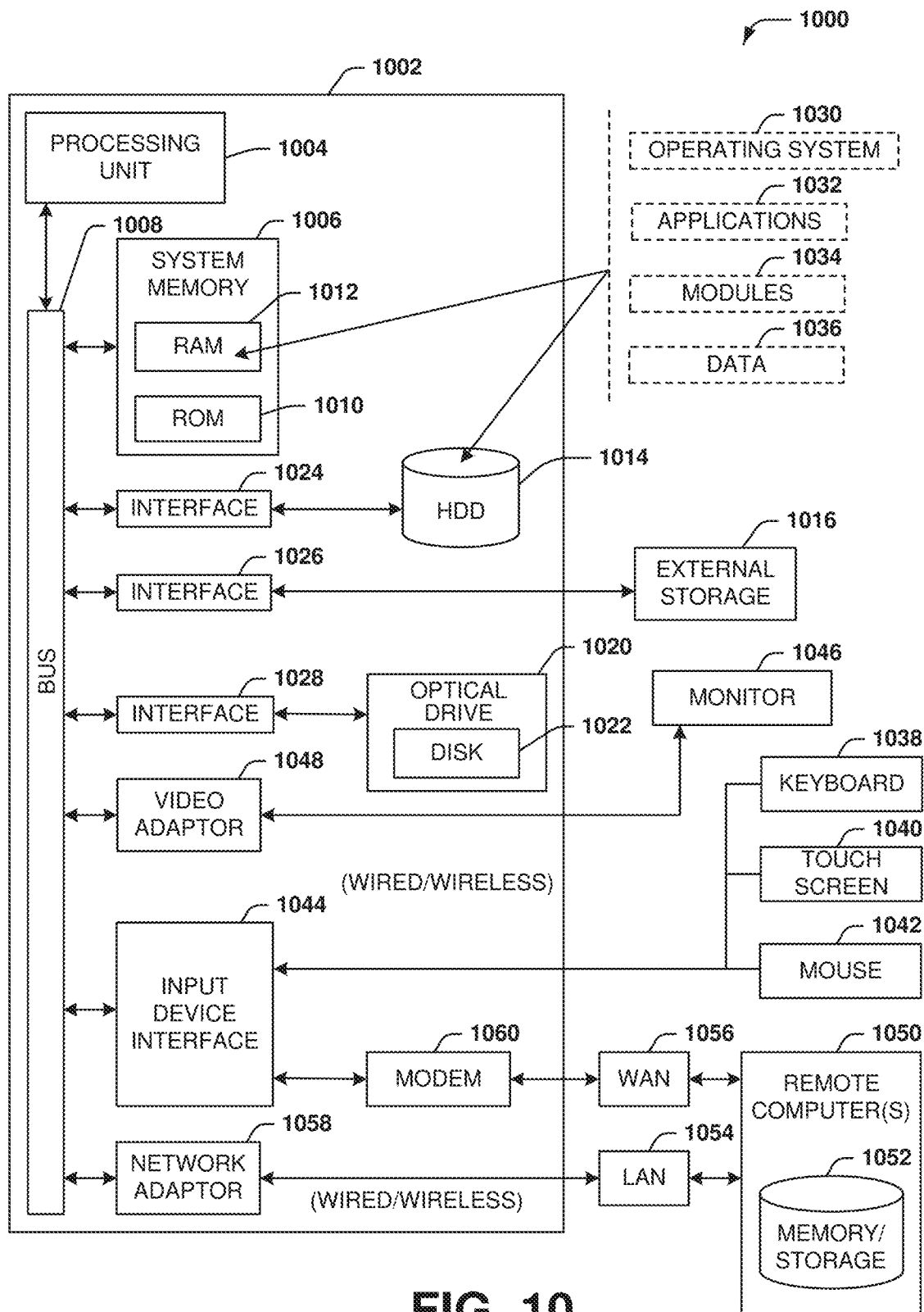
FIG. 10 is a block diagram of an example computer that can be operable to execute processes and methods in accordance with various aspects and embodiments of the subject disclosure.
Figure 11:
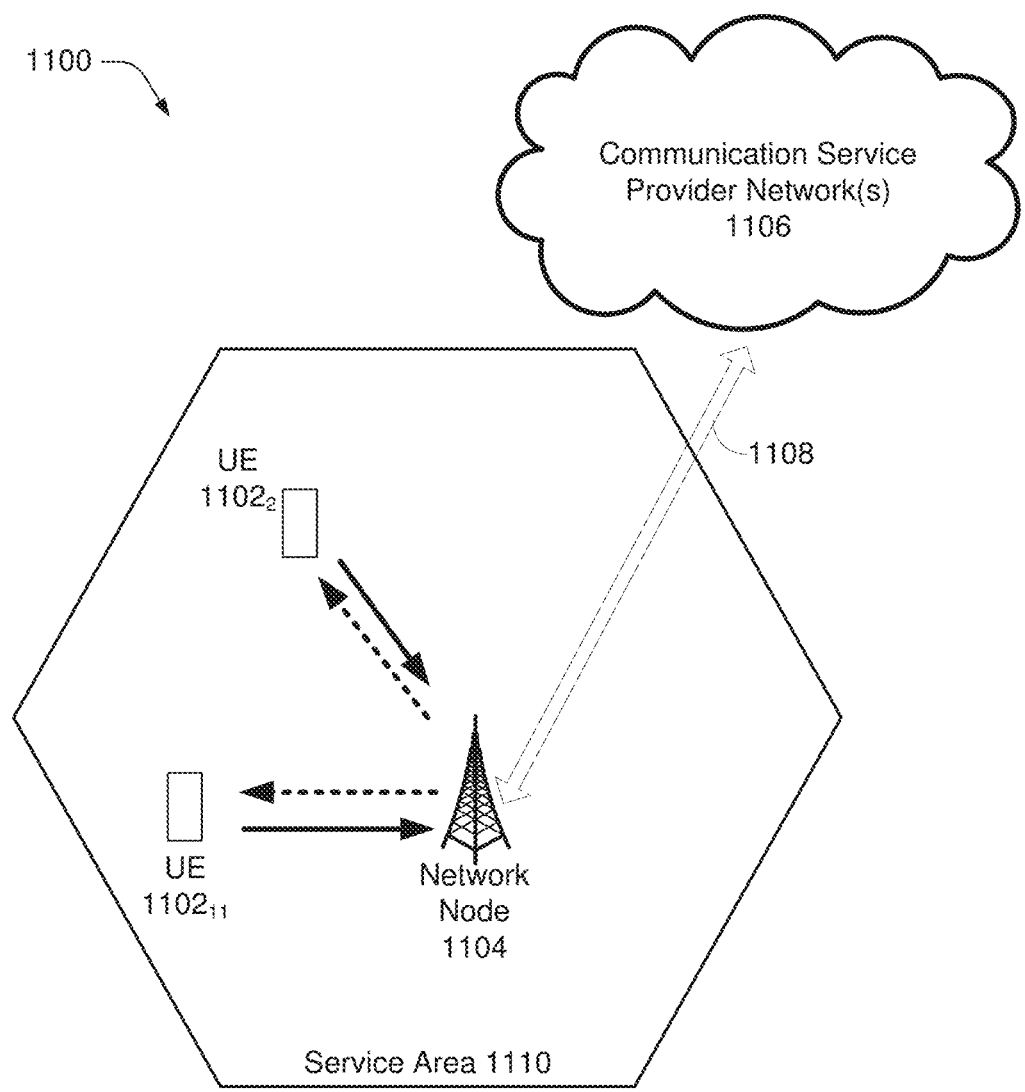
FIG. 11 illustrates an example wireless communication system, in accordance with various aspects and embodiments of the subject disclosure.

FIG. 10 and FIG. 11 are included herewith to provide example device and network environments in which embodiments of this disclosure can be deployed. It is appreciated that this disclosure can be deployed in diverse scenarios. For example, embodiments can be useful for automating network architecture changes. Improvements in a network can be automated using reinforcement learning. Embodiments of this disclosure can be used as a scoring metric for architecture changes, to provide positive or negative scores. In the context of 5G "big data" enabled self-organizing networks (SON), 5G cells may no longer be expected to operate in the "always ready on" mode. Instead, there may exist multiple energy saving modes of operation for 5G nodes such as off, stand-by, hot stand-by, sleep and hibernation. These diverse modes of energy operation can use knowledge of and coordination with other aspects of 5G performance. For a 5G SON engine to provide "seamless" network performance, it can use data at different levels (e.g., subscriber, cell, and core network). Embodiments of this disclosure can allow a SON engine to initiate and submit self-configuration/self-optimization/self-healing requests to the network, based on data latency cumulative probability distribution comparisons.

In another example, embodiments can be useful for applications in the cloud, e.g., to compare condition A versus condition B in order to make architecture configuration decisions. Clouds can implement component to component communication, e.g., passing information via events, message queue, database, etc., and a server component can have upstream delay in sending information to a client component. For example, an application moving to the cloud may still communicate with services inside a network. Using the techniques described herein, data latency cumulative probability distributions can be compared in different connection modes.

In further example, this disclosure can be applied in connection with universal customer premise equipment (uCPE) deployments at on premise sites. uCPE deployments are currently configured with virtual network functions (VNFs). Edge service VNFs (representing on premise managed services) can be added to these devices so as to provide edge services to customers. Embodiments of this disclosure can provide additional functionality to managed services enhanced uCPE devices, by allowing uCPE devices to determine whether they will have sufficient data at low enough latencies to justify processing at the edge.

Still further examples include applications involving sensor data, e.g., environmental or health data that may be used to determine what to report or how to change an environment, e.g., by changing temperature. In health monitoring, questions arise regarding how long to wait for sufficient data to make a prediction about patient health. Embodiments of this disclosure are useful to make such determinations with better information about likely data latency.

Edge devices can be configured to decide what analytics should be done on the edge, versus in the "fog," versus data lake comparing latency/completeness needs. Embodiments of this disclosure can be used in connection with determinations regarding whether a particular decision should be made on the edge, requiring low latency, or in the backend, requiring a complete/larger sample of data.

In an autonomous vehicle example, based on sensor data, data from other cars, weather conditions, and map information, a vehicle may make a lane change decision, with an ultra-low latency requirement, or the vehicle may make a route determination, with a more relaxed latency requirement. Embodiments of this disclosure can be used to determine whether waiting for additional data is likely to be productive.

In a video monitoring analysis example, based on video monitors in a store or on a street, a device may be tasked with a time-sensitive decision to act on data from one video monitor versus several, versus going to the data lake for further data. In a spam calls example, devices may make latency sensitive determinations regarding whether to make a determination that a caller is a spammer and should be disconnected.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 11 illustrates a non-limiting example of a wireless communication system 1100 which can be used in connection with at least some embodiments of the subject disclosure. In one or more embodiments, system 1100 can comprise one or more user equipment UEs 1102$_1$, 1102$_2$, referred to collectively as UEs 1102, a network node 1104 that supports cellular communications in a service area 1110, also known as a cell, and communication service provider network(s) 1106.

The non-limiting term "user equipment" can refer to any type of device that can communicate with a network node 1104 in a cellular or mobile communication system 1100. UEs 1102 can have one or more antenna panels having vertical and horizontal elements. Examples of UEs 1102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 1102 can also comprise IOT devices that communicate wirelessly.

In various embodiments, system 1100 comprises communication service provider network(s) 1106 serviced by one or more wireless communication network providers. Communication service provider network(s) 1106 can comprise a "core network". In example embodiments, UEs 1102 can be communicatively coupled to the communication service provider network(s) 1106 via network node 1104. The network node 1104 (e.g., network node device) can communicate with UEs 1102, thus providing connectivity between the UEs 1102 and the wider cellular network. The UEs 1102 can send transmission type recommendation data to the network node 1104. The transmission type recommendation data can comprise a recommendation to transmit data via a closed loop multiple input multiple output (MIMO) mode and/or a rank-1 precoder mode.

A network node 1104 can have a cabinet and other protected enclosures, computing devices, an antenna mast, and multiple antennas for performing various transmission operations (e.g., MIMO operations) and for directing/steering signal beams. Network node 1104 can comprise one or more base station devices which implement features of the network node 1104. Network nodes can serve several cells, also called sectors or service areas, such as service area 1110, depending on the configuration and type of antenna. In example embodiments, UEs 1102 can send and/or receive communication data via a wireless link to the network node 1104. The dashed arrow lines from the network node 1104 to the UEs 1102 represent downlink (DL) communications and the solid arrow lines from the UEs 1102 to the network node 1104 represents an uplink (UL) communications.

Communication service provider networks 1106 can facilitate providing wireless communication services to UEs 1102 via the network node 1104 and/or various additional network devices (not shown) included in the one or more communication service provider networks 1106. The one or more communication service provider networks 1106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 1100 can be or comprise a large scale wireless communication network that spans various geographic areas. According to this implementation, the one or more communication service provider networks 1106 can be or comprise the wireless communication network and/or various additional devices and components of the wireless communication network (e.g., additional network devices and cell, additional UEs, network server devices, etc.).

The network node 1104 can be connected to the one or more communication service provider networks 1106 via one or more backhaul links 1108. For example, the one or more backhaul links 1108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 1108 can also comprise wireless link components, such as but not limited to, line-of-sight (LOS) or non-LOS links which can comprise terrestrial air-interfaces or deep space links (e.g., satellite communication links for navigation). Backhaul links 1108 can be implemented via a "transport network" in some embodiments. In another embodiment, network node 1104 can be part of an integrated access and backhaul network. This may allow easier deployment of a dense network of self-backhauled 5G cells in a more integrated manner by building upon many of the control and data channels/procedures defined for providing access to UEs.

Wireless communication system 1100 can employ various cellular systems, technologies, and modulation modes to facilitate wireless radio communications between devices (e.g., the UE 1102 and the network node 1104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 1100 can operate in accordance with any 5G, next generation communication technology, or existing communication technologies, various examples of which are listed supra. In this regard, various features and functionalities of system 1100 are applicable where the devices (e.g., the UEs 1102 and the network device 1104) of system 1100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 1100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    collecting, by a system comprising a processor, for a first performance benchmark, first data latency values associated with data delivery via a first configuration of a network, resulting in first collected data latency values;
    collecting, by the system, for a second performance benchmark, second data latency values associated with data delivery via a second configuration of the network, resulting in second collected data latency values, wherein the first collected data latency values and second collected data latency values are associated with a same level of data delivery completeness;
    generating, by the system, using the first collected data latency values, a first data latency cumulative probability distribution associated with the first performance benchmark, the first data latency cumulative probability distribution representing first probabilities of observed data latency values being less than or equal to distribution latency values;
    generating, by the system, using the second collected data latency values, a second data latency cumulative probability distribution associated with the second performance benchmark, the second data latency cumulative probability distribution representing second probabilities of the observed data latency values being less than or equal to the distribution latency values;
    comparing, by the system, the second data latency cumulative probability distribution associated with the second performance benchmark with the first data latency cumulative probability distribution associated with the first performance benchmark; and
    selecting, by the system, based on a result of the comparing of the second data latency cumulative probability distribution associated with the second benchmark with the first data latency cumulative probability distribution associated with the first performance benchmark, the first configuration of the network or the second configuration of the network for data delivery via the network.

2. The method of claim 1, further comprising determining, by the system, based on the first data latency cumulative probability distribution, whether a probability of the first probabilities is less than or equal to a determined value.

3. The method of claim 1, wherein the same level of data delivery completeness comprises a same group of multiple different levels of data completeness.

4. The method of claim 1, wherein the same level of data delivery completeness comprises a partial level of data delivery completeness.

5. The method of claim 1, wherein comparing the second data latency cumulative probability distribution with the first data latency cumulative probability distribution comprises comparing a second probability of the second probabilities and a first probability of the first probabilities, wherein the first probability and the second probability are associated with a selected distribution latency value of the distribution latency values.

6. The method of claim 1, wherein comparing the second data latency cumulative probability distribution with the first data latency cumulative probability distribution comprises determining whether second ones of the second probabilities of the second data latency cumulative probability distribution comprise greater probabilities of respective latencies being below selected distribution latency values than corresponding first ones of the first probabilities associated with the first data latency cumulative probability distribution.

7. The method of claim 1, wherein the same level of data delivery completeness comprises a minimum amount of data to complete a minimum computation using the data.

8. The method of claim 1, wherein the same level of data delivery completeness comprises an amount of data sufficient to complete a full computation using the data.

9. A system, comprising:
    a processor; and
    a memory that stores executable instructions that, when executed by the processor, perform operations, comprising:
        generating, fora first performance benchmark associated with a first equipment configuration, a first data latency cumulative probability distribution for a first level of data delivery completeness, the first data latency cumulative probability distribution comprising first distribution probabilities of observed data latency values being less than or equal to distribution latency values;

generating, fora second performance benchmark associated with a second equipment configuration, a second data latency cumulative probability distribution for the first level of data delivery completeness, the second data latency cumulative probability distribution comprising second distribution probabilities of the observed data latency values being less than or equal to the distribution latency values;

comparing the second data latency cumulative probability distribution with the first data latency cumulative probability distribution to determine which of the second data latency cumulative probability distribution or the first data latency cumulative probability distribution comprises a greater probability of an observed data latency value of the observed data latency values being below a selected target latency value; and selecting, based on a result of the comparing of the second data latency cumulative probability distribution with the first data latency cumulative probability distribution, the first equipment configuration or the second equipment configuration for data delivery to a consumer.

10. The system of claim 9, wherein comparing the second data latency cumulative probability distribution with the first data latency cumulative probability distribution comprises comparing the second distribution probabilities with the first distribution probabilities at multiple distribution latency values of the distribution latency values.

11. The system of claim 9, wherein comparing the second data latency cumulative probability distribution with the first data latency cumulative probability distribution comprises comparing the second distribution probabilities with the first distribution probabilities at all of the distribution latency values.

12. The system of claim 9, wherein generating the first data latency cumulative probability distribution comprises collecting, for the first performance benchmark of data, first data latency values associated with multiple levels of data delivery completeness including the first level of data delivery completeness, and wherein generating the second data latency cumulative probability distribution comprises collecting, for the second performance benchmark of data, second data latency values associated with the multiple levels of data delivery completeness including the first level of data delivery completeness.

13. The system of claim 9, wherein:
generating the first data latency cumulative probability distribution comprises conducting the first performance benchmark using the first equipment configuration; and
generating the second data latency cumulative probability distribution comprises conducting the second performance benchmark using the second equipment configuration.

14. The system of claim 13, wherein first level of data delivery completeness comprises a partial level of data delivery completeness.

15. A non-transitory machine-readable medium, comprising executable instructions that, when executed by a processor of a user equipment, perform operations comprising:

collecting, for a first performance benchmark, first data latency values associated with data delivery via a first configuration of a network to a consumer, resulting in first collected data latency values;

collecting, for a second performance benchmark, second data latency values associated with data delivery via a second configuration of the network to the consumer, resulting in second collected data latency values, wherein the first collected data latency values and second collected data latency values are associated with a same level of data delivery completeness;

generating, using the first collected data latency values, a first data latency cumulative probability distribution associated with the first performance benchmark, the first data latency cumulative probability distribution representing first probabilities of observed data latency values being less than or equal to distribution latency values;

generating, using the second collected data latency values, a second data latency cumulative probability distribution associated with the second performance benchmark, the second data latency cumulative probability distribution representing second probabilities of the observed data latency values being less than or equal to the distribution latency values;

comparing the second data latency cumulative probability distribution associated with the second performance benchmark with the first data latency cumulative probability distribution associated with the first performance benchmark; and selecting, based on a result of the comparing of the second data latency cumulative probability distribution associated with the second benchmark with the first data latency cumulative probability distribution associated with the first performance benchmark, the first configuration of the network or the second configuration of the network for data delivery via the network to the consumer.

16. The non-transitory machine-readable medium of claim 15, wherein the same level of data delivery completeness comprises a minimum amount of data to complete a minimum computation using the data.

17. The non-transitory machine-readable medium of claim 15, wherein the level of data delivery completeness comprises a partial level of data delivery completeness.

18. The non-transitory machine-readable medium of claim 15, wherein comparing the second data latency cumulative probability distribution with the first data latency cumulative probability distribution comprises determining whether the second data latency cumulative probability distribution is stochastically greater than the first data latency cumulative probability distribution.

19. The non-transitory machine-readable medium of claim 15, wherein the operations further comprise comparing the second data latency cumulative probability distribution and the first data latency cumulative probability distribution with a download requirement for data delivery via the network to the consumer.

20. The non-transitory machine-readable medium of claim 15, wherein the operations further comprise comparing the second data latency cumulative probability distribution and the first data latency cumulative probability distribution with a service level agreement requirement for data delivery via the network to the consumer.

* * * * *